(12) United States Patent
Dong

(10) Patent No.: US 12,479,888 B2
(45) Date of Patent: Nov. 25, 2025

(54) POLYPEPTIDE AND APPLICATION THEREOF

(71) Applicant: HDL SOLUTIONS OTTAWA, Ottawa (CA)

(72) Inventor: Fumin Dong, Ottawa (CA)

(73) Assignee: HDL SOLUTIONS OTTAWA, Ottawa (CA)

( * ) Notice: Subject to any disclaimer, the term of this patent is extended or adjusted under 35 U.S.C. 154(b) by 846 days.

(21) Appl. No.: 17/635,527

(22) PCT Filed: Aug. 28, 2020

(86) PCT No.: PCT/CN2020/112007
§ 371 (c)(1),
(2) Date: Feb. 15, 2022

(87) PCT Pub. No.: WO2021/037187
PCT Pub. Date: Mar. 4, 2021

(65) Prior Publication Data
US 2022/0298209 A1     Sep. 22, 2022

(30) Foreign Application Priority Data
Aug. 29, 2019   (CN) .......................... 201910807205.3

(51) Int. Cl.
| | | |
|---|---|---|
| C07K 14/00 | (2006.01) | |
| A61K 38/00 | (2006.01) | |
| A61K 47/54 | (2017.01) | |
| A61P 9/10 | (2006.01) | |
| C07K 7/08 | (2006.01) | |

(52) U.S. Cl.
CPC .......... *C07K 14/001* (2013.01); *A61K 47/542* (2017.08); *A61P 9/10* (2018.01); *C07K 7/08* (2013.01); *A61K 38/00* (2013.01)

(58) Field of Classification Search
None
See application file for complete search history.

(56) References Cited

FOREIGN PATENT DOCUMENTS

| | | | |
|---|---|---|---|
| CN | 109200273 A | 1/2019 | |
| WO | 2000/78970 A1 | 12/2000 | |
| WO | 2001/32184 A2 | 5/2001 | |
| WO | WO-0132184 A2 * | 5/2001 | ............. A61K 31/64 |
| WO | 2008115303 A2 | 9/2008 | |
| WO | 2015/187295 A2 | 12/2015 | |

OTHER PUBLICATIONS

International Search Report issued in corresponding International Application No. PCT/CN2020/112007 dated Nov. 25, 2020, pp. 1-4, English Translation.
Azhar, A. et al., "Novel ABCA1 peptide agonists with antidiabetic action" Mol Cell Endocrinol. (Jan. 2019) pp. 1-11, vol. 480.
Ying, R. et al., "Protective Effect and Mechanism of Apolipoprotein A-1 Mimetic Peptide L-4F on Atherosclerosis in Mice Model" Chinese Circulation Journal (Sep. 2013) pp. 379-383, vol. 28, No. 5, English abstract.
Extended European Search Report issued in corresponding EP Patent Application No. 20855987.2 dated Dec. 7, 2022, pp. 1-15.
Zheng, Y. et al., "HDL Mimetic Peptide ATI-5261 Forms an Oligomeric Assembly in Solution That Dissociates to Monomers upon Dilution" Biochemistry (May 2011) pp. 4068-4076, vol. 50, No. 19.

* cited by examiner

*Primary Examiner* — Sudhakar Katakam
*Assistant Examiner* — Zachary J Miknis
(74) *Attorney, Agent, or Firm* — Carter, DeLuca & Farrell LLP

(57) ABSTRACT

The present disclosure provides a polypeptide and application thereof. The polypeptide comprises a peptide fragment composed of 16-23 consecutive amino acids in an amino acid sequence represented by SEQ ID NO: 1; or the polypeptide comprises a polypeptide fragment which consists of 16-23 consecutive amino acids of the amino acid sequence of SEQ ID NO: 1 in the opposite direction of the peptide sequence (reverse peptide). The polypeptide can be used to mitigate metabolic syndrome, achieve weight loss, prevent and treat nonalcoholic fatty liver diseases and cardiovascular diseases.

12 Claims, 7 Drawing Sheets
Specification includes a Sequence Listing.

LDL$^{-/-}$   HFD

LDL$^{-/-}$   HFD+21H21

SEQUENCE LISTING

<160> NUMBER OF SEQ ID NOS: 8

<210> SEQ ID NO 1
<211> LENGTH: 23
<212> TYPE: PRT
<213> ORGANISM: Artificial Sequence
<220> FEATURE:
<223> OTHER INFORMATION: Synthetic polypeptide

<400> SEQUENCE: 1

Phe Ala Tyr Leu Gln Asp Val Val Glu Gln Ala Ile Ile Arg Val Leu
1               5                   10                  15

Thr Gly Thr Glu Lys Lys Thr
            20

<210> SEQ ID NO 2
<211> LENGTH: 22
<212> TYPE: PRT
<213> ORGANISM: Artificial Sequence
<220> FEATURE:
<223> OTHER INFORMATION: Synthetic polypeptide

<400> SEQUENCE: 2

Phe Ala Tyr Leu Gln Asp Val Val Glu Gln Ala Ile Ile Arg Val Leu
1               5                   10                  15

Thr Gly Thr Glu Lys Lys
            20

<210> SEQ ID NO 3
<211> LENGTH: 21
<212> TYPE: PRT
<213> ORGANISM: Artificial Sequence
<220> FEATURE:
<223> OTHER INFORMATION: Synthetic polypeptide

<400> SEQUENCE: 3

Phe Ala Tyr Leu Gln Asp Val Val Glu Gln Ala Ile Ile Arg Val Leu
1               5                   10                  15

Thr Gly Thr Glu Lys
            20

<210> SEQ ID NO 4
<211> LENGTH: 20
<212> TYPE: PRT
<213> ORGANISM: Artificial Sequence
<220> FEATURE:
<223> OTHER INFORMATION: Synthetic polypeptide

<400> SEQUENCE: 4

Phe Ala Tyr Leu Gln Asp Val Val Glu Gln Ala Ile Ile Arg Val Leu
1               5                   10                  15

Thr Gly Thr Glu
            20

<210> SEQ ID NO 5
<211> LENGTH: 19
<212> TYPE: PRT
<213> ORGANISM: Artificial Sequence
<220> FEATURE:
<223> OTHER INFORMATION: Synthetic polypeptide

<400> SEQUENCE: 5

Phe Ala Tyr Leu Gln Asp Val Val Glu Gln Ala Ile Ile Arg Val Leu
1               5                   10                  15

```
Thr Gly Thr

<210> SEQ ID NO 6
<211> LENGTH: 18
<212> TYPE: PRT
<213> ORGANISM: Artificial Sequence
<220> FEATURE:
<223> OTHER INFORMATION: Synthetic polypeptide

<400> SEQUENCE: 6

Phe Ala Tyr Leu Gln Asp Val Val Glu Gln Ala Ile Ile Arg Val Leu
1               5                   10                  15

Thr Gly

<210> SEQ ID NO 7
<211> LENGTH: 17
<212> TYPE: PRT
<213> ORGANISM: Artificial Sequence
<220> FEATURE:
<223> OTHER INFORMATION: Synthetic polypeptide

<400> SEQUENCE: 7

Phe Ala Tyr Leu Gln Asp Val Val Glu Gln Ala Ile Ile Arg Val Leu
1               5                   10                  15

Thr

<210> SEQ ID NO 8
<211> LENGTH: 16
<212> TYPE: PRT
<213> ORGANISM: Artificial Sequence
<220> FEATURE:
<223> OTHER INFORMATION: Synthetic polypeptide

<400> SEQUENCE: 8

Phe Ala Tyr Leu Gln Asp Val Val Glu Gln Ala Ile Ile Arg Val Leu
1               5                   10                  15
```

POLYPEPTIDE AND APPLICATION THEREOF

CROSS REFERENCE TO RELATED APPLICATIONS

The present application is a national stage application of International Application No. PCT/CN2020/112007, filed Aug. 28, 2020, which claims the benefit and priority of Chinese Patent Application No. 201910807205.3, filed Aug. 29, 2019, the entire contents of each of which are hereby incorporated by reference herein in their entirety.

REFERENCE TO SEQUENCE LISTING SUBMITTED VIA EFS-WEB

This application includes an electronically submitted sequence listing in.txt format. The.txt file contains a sequence listing entitled "1399-55 PCT US_ST25.txt" created on Jan. 25, 2022, and is 2,570 bytes in size. The sequence listing contained in this.txt file is part of the specification and is hereby incorporated by reference herein in its entirety.

FIELD OF THE INVENTION

The invention belongs to the field of biomedicine, and is specifically related to a polypeptide and its application.

BACKGROUND OF THE INVENTION

Nonalcoholic fatty liver disease (NAFLD) is characterized with excessive accumulation of lipids such as triglycerides and free cholesterol in hepatocytes. It has been estimated that NAFLD accounts for about 25% general population worldwide. NAFLD prevalence was reported in ~50% of obesity patients, ~23% of type 2 diabetes patients, ~70% of hyperlipidemia patients, ~40% of hypertension patients and ~41% of hypertriglyceridemia patients. Patients with NAFLD have potential for progressive liver disease, namely nonalcoholic steatohepatitis (NASH), hepato-cellular carcinoma (HCC), and cirrhosis.

Due to unknown and unpredictable natural history of NAFLD, no specific pharmacologic therapies for NAFLD have been approved by regulatory agencies. One of interventions to manage NAFLD is to modify lifestyle, e.g. diet, exercise, and weight loss. Practice Guidance recommends weight loss of at least 3%-5% to improve steatosis, more weight loss (7%-10%) to benefit the histopathological features of NASH, including fibrosis. Although virus infection, drugs, metabolic conditions and toxins can cause NAFLD, the main risk factors are obesity, glucose intolerance, hypertension, hypertriglyceridemia, low HDL cholesterol. Compared to control populations, NAFLD patients have higher mortality with cardiovascular disease (CVD) being the leading cause of death (38%) versus direct complications of liver disease (8%).

Since high levels of LDL are associated with increased risk of atherosclerosis, and HDL concentration correlates inversely with the development of atherosclerosis, lowing LDL or increasing HDL has become the two main interventions. By inhibiting the HMG-CoA reductase to reduce cholesterol synthesis, statins are able to decrease LDL up to 50-60%. Therefore statins currently turn into primary therapy for atherosclerosis and cardiovascular disease. However, reports shown that postmenopausal women have a two-fold risk of developing breast cancers compared to users who have never used statins. Statin therapy even triggers new onset of diabetes. Other adverse effects of statins include cognitive loss, neuropathy, pancreatic and hepatic dysfunction, and sexual dysfunction. In addition, statins protect patients against cardiovascular morbidity with less than 30% of efficacy. The rationale for statin use in patients with NAFLD is that the increased risks of CVD and cardiovascular-related death outweigh the adverse effects of statins especially in a situation of no effective therapeutic options. Thus, it is necessary to seek alternative therapeutic approaches to manage fatty liver disease, cardiovascular diseases.

ATP Binding Cassette Subfamily A Member 1 (ABCA1) is a membrane-associated transporter protein which effluxes cholesterol and phospholipids to extracellular lipid-poor apoA1 to form nascent HDL. Enzymatic activity on nascent HDL particles results in mature HDL particles to participate in the clearance of cholesterol and phospholipids from peripheral tissues. The excessive cholesterol can be delivered to liver and then secreted into bile for their clearance via feces. Mutations in human ABCA1 may lead to familial HDL deficiency and Tangier disease due to low cholesterol efflux capacity. More foam cells filled with lipids appear in tissues of the patients. It has been shown that HMG-CoA reductase expression is increased and cholesterol efflux capacity is impaired in NAFLD and NASH with a result of cellular cholesterol accumulation.

SUMMARY OF THE INVENTION

Given the role of ABCA1 in cholesterol efflux, inventor of the current application presumes that it is possible to lower lipid accumulation in hepatocytes, reduce inflammation, stabilize or treat atherosclerosis by managing ABCA1, thereby completing the current invention.

One objective of the current invention is to provide a first-in-class polypeptide that is able to prevent and treat non-alcoholic fatty liver, atherosclerosis or metabolic syndrome, or achieve weight loss.

Another objective of the current invention is to define the application of the polypeptide.

In one embodiment, the present invention is directed to a polypeptide, wherein the polypeptide comprises a polypeptide fragment which consists of 16-23, preferably 16-21, or most preferably 21 consecutive amino acids of the amino acid sequence of SEQ ID NO: 1.

Preferably, the polypeptide of the present invention comprises a polypeptide fragment selected from SEQ ID NO: 1, SEQ ID NO: 2, SEQ ID NO: 3, SEQ ID NO: 4, SEQ ID NO: 5, SEQ ID NO: 6, SEQ ID NO: 7 and SEQ ID NO: 8. More preferably, the polypeptide has the consecutive amino acid sequence of any of SEQ ID NO: 1, SEQ ID NO: 2, SEQ ID NO: 3, SEQ ID NO: 4, SEQ ID NO: 5, SEQ ID NO:6, SEQ ID NO: 7 and SEQ IDNO: 8.

Preferably, one or more of the amino acids in the polypeptide of the present invention is in D-enantiomeric form. More preferably, all amino acids of the polypeptide are in D-enantiomeric forms.

Preferably, the polypeptide of the present invention is further modified.

The polypeptide of the current invention can be modified by means of available techniques. Polypeptide modifications include and are not limited to N-terminal modification, C-terminal modification, side chain modification, amino acid modification, peptide backbone modification, etc. Polypeptide modification may optimize the physical and chemical properties of polypeptide, improve its water solubility, extend its biological life, change its distribution, be not immunogenic, and reduce its adverse effects.

Preferably, the polypeptide of the current invention is conjugated by stearic acid. More preferably, the polypeptide of the current invention is conjugated by stearic acid to its end (for example, the N-terminus).

Other polypeptide modifications include, but are not limited to, amination modification, acetylation modification, biotinylation modification, fluorescent label modification, polyethylene glycol modification, prenylation modification, myristoylation and palmitoylation modification, phosphorylation modification, glycosylation modification, polypeptide conjugate modification, special amino acid modification, etc.

Secondly, the current invention defines the application of the polypeptide for the prevention or treatment of non-alcoholic fatty liver, atherosclerosis or metabolic syndrome, or for weight loss.

In the current invention, the metabolic syndrome refers to a pathological condition under which the metabolic disorder occurs to protein, fat, carbohydrates, etc. in human body. It is a set of risk factors that are linked to lead to a higher chance of developing diabetes and cardiovascular diseases.

The mouse model of atherosclerosis (apoE knockout mice) was used during the current invention. The invivo experiment was carried out with the intravenous injection of polypeptides at low dose of 50 micrograms per mouse once every four days for four weeks. Compared to untreated mice, polypeptide was able to prevent the accumulation of neutral lipids in liver tissue caused by high-fat and high-cholesterol diet by 53%; offset the weight gain by the diet; prevent atherosclerotic plaque at the aortic root by 35%; and prevent atherosclerotic lesion of full-length aorta by 48%. It has been confirmed that the bilateral relationship exists among the risk factors such as obesity, diabetes, metabolic syndrome to developinto fatty liver and atherosclerosis. Therefore, the polypeptide of the current invention may have the potential to improve metabolic syndrome, control body weight, and treat non-alcoholic fatty liver disease and cardiovascular disease.

MODE OF THE INVENTION

Figure 1A:
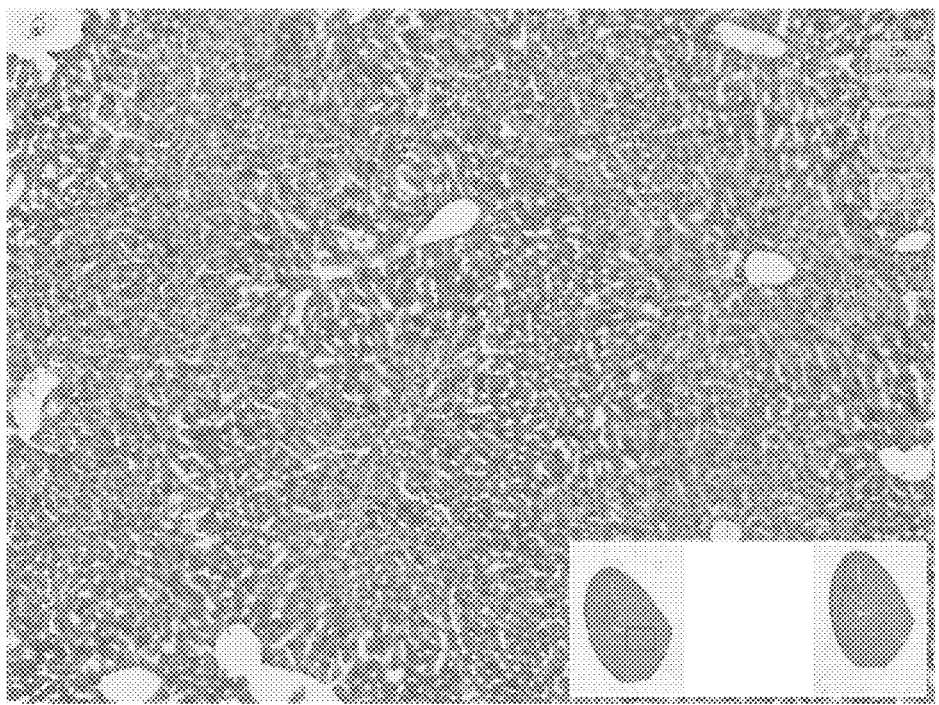
FIG. 1A shows Oil Red O staining of cryostat section of liver from apoE knockout mice fed with low fat diet (Chow) in Experimental Example 2.

For better understanding the features and the efficacy of current invention, terms and descriptions related to the patent application are defined as follows. Unless otherwise specified, all technical and scientific terms used in the current invention are understandable by individuals working in this field. In case of conflict, the following definitions shall prevail.

The terms "comprise", "include", "have", "contain" or any other similar terms are all open-ended transitional phrases, which are intended to cover but not to exclude. For example, a composition or article containing plural elements is not limited to the elements listed herein, but may also include other elements that are not explicitly listed but are generally inherent in the composition or article. In addition, unless expressly stated to the contrary, the term "or" refers to an inclusive "or" rather than an exclusive "or". For example, any one of the following conditions satisfies the condition "A or B": A is true (or exists) and B is false (or does not exist), A is false (or does not exist) and B is true (or exists), Both A and B are true (or exist). The interpretation of the terms "comprise", "include", "have", "contain" shall be deemed to have been specifically disclosed and at the same time cover "consist of" and "substantially consist of" and other closures or semi-closed connectives.

All features or conditions defined in the form of numerical ranges or percentage ranges are only for the purpose of brevity and convenience. Accordingly, the description of the numerical range or the percentage range should be regarded as covering and specifically disclosing all possible sub-ranges and individual values within the range, especially integer values. For example, the description of the range of "1 to 8" should be deemed to have disclosed all sub-ranges such as 1 to 7, 2 to 8, 2 to 6, 3 to 6, 4 to 8, 3 to 8, etc., and especially secondary range defined by all integer values such as 1, 2, 3, 4, 5, 6, 7, and 8. Unless otherwise specified, the foregoing interpretation is applicable to all content of the full text of the current invention, regardless of its broad scope or not.

If a quantity or other value or a parameter is expressed in terms of a range, a preferred range, or a series of upper and lower limits, it should be considered that this expression has specifically disclosed any upper limit or preferred value of the range and the lower limit of the range, or all ranges constituted by preferred values, regardless of whether these ranges are separately disclosed. In addition, when a numerical range is mentioned, unless otherwise specified, the range should include its endpoints and all integers and fractions within the range.

Under the condition that the invention is achievable, a numerical value should be considered to have the accuracy with significant digits of the numerical value. For example, the number 40.0 should be considered to cover the range from 39.50 to 40.49.

The following specific implementation modalities are merely illustrative in nature, and are not intended to limit the current invention and its application. In addition, this current document is not limited by any theory described in the foregoing prior art or invention content or the following specific implementation modalities.

PREPARATION EXAMPLES

Preparation Example 1

Solid-phase synthesis has been used to synthesize polypeptides by CASLOApS, c/o Scion Denmark Technical University, Diplomvej 381, DK-2800, Lyngby, Denmark (FAYLQDVVEQAIIRVLTGTEKKT); SEQ ID NO: 1

(FAYLQDVVEQAIIRVLTGTEKK); SEQ ID NO: 2

(FAYLQDVVEQAIIRVLTGTEK); SEQ ID NO: 3

(FAYLQDVVEQAIIRVLTGTE); SEQ ID NO: 4

(FAYLQDVVEQAIIRVLTGT); SEQ ID NO: 5

(FAYLQDVVEQAIIRVLTG); SEQ ID NO: 6

(FAYLQDVVEQAIIRVLT); SEQ ID NO: 7

(FAYLQDVVEQAIIRVL). SEQ ID NO: 8

Preparation Example 2

Stearic acid was conjugated to the N-terminus of polypeptide SEQ ID NO: 3 (FAYLQDVVEQAIIRVLTGTEK) to become polypeptide 21H21. The procedures were as follows: The polypeptide was synthesized first by solid-phase synthesis, followed by the conjugation of stearic acid to the N-terminus of the polypeptide through a chemical reaction. The stearic acid-polypeptide was released from the solid phase through a chemical reaction. The synthesized polypeptide was purified to homogeneity (>98%) by reversed-phase chromatography. The purity of the polypeptide was determined by high-performance liquid chromatography (HPLC), and the molecular weight of polypeptide was confirmed by mass spectrometry (MALDI-TOF).

Preparation of peptides for tail vein injection: first add 25 microliters of DMSO (D2650, Sigma-Aldrich) to dissolve 1 mg of synthetic peptides, and then add 475 microliters of 1× PBS buffer. The final concentration of the sample is 2µg/µl (5% DMSO). 1× PBS buffer (10mM phosphate, 150 mMNaCl, pH 7.5): dissolve 1.42 g of $Na_2HPO_4$, 8.75 g of NaCl in 950 ml of distilled water, adjust pH to 7.5 with phosphoric acid, add distilled water to a total volume of 1 liter, sterilize the solution at high temperature.

EXPERIMENTAL EXAMPLES

Experimental Example 1: Animal Procedures

Male apoE knockout mice (C57BL/6J) at age of 10 weeks were purchased from GemPharmatech, Nanjing, Jiangsu, China. The mice were fed with low fat diet [SPF growth and reproduction feed for rats and mice: 12.95% fat (wt/wt), 24.02% protein (wt/wt)] from Beijing KeaoXieli Feed Co. Ltd., Beijing, China in a pathogen-free facility for two weeks, and then divided into the following three groups (8 mice each group): (a) the control group was fed low fat diet, referred to as Chow; (b) the high-fat group was fed high-fat diet (HFD) [21% fat (wt/wt), 0.15% (wt/wt) cholesterol, 20% protein (wt/wt), Research Diets, New Brunswick, NJ, D12079B], referred to as the HFD; (c) the treatment group was fed high-fat diet plus the injection through tail vein with polypeptide 21H21 (50 µg/200µL 1× PBS) once every four days, referred to as the HFD+21H21. The total injection was 10 times. One day after the last injection, the mice were anesthetized and euthanized in carbon dioxide, and then blood, liver and aorta were collected. During the period of the experiment, each group of mice was weighed. All animal experiments were carried out in accordance with the animal management guidelines of the People's Republic of China.

Polypeptide 21H21 of the current invention was able to offset weight gain by high-fat diet in apoE knockout mice (table 1).

TABLE 1

| | | | | Change of body weight | |
| --- | --- | --- | --- | --- | --- |
| | Average body weight per mouse (g) | | | Percentage increase of body weight (HFD vs Chow) | Percentage decrease of body weight (HFD + 21H21 vs HFD) |
| Time | Chow | HFD | HDF + 21H21 | | |
| Day 83 | | | | Starting date of experiment | |
| Day 88 | 27.13 | 27.96 | 24.38 | 3.08 | 12.82 |
| Day 97 | 28.1 | 29.02 | 24.83 | 3.27 | 14.46 |
| Day 105 | 27.48 | 29.94 | 25.21 | 8.97 | 15.79 |
| Day 110 | 28.08 | 29.72 | 25.61 | 5.86 | 13.82 |

TABLE 1-continued

|  | Average body weight per mouse (g) | | | Change of body weight | |
|---|---|---|---|---|---|
|  |  |  |  | Percentage increase of body weight (HFD vs | Percentage decrease of body weight (HFD + 21H21 |
| Time | Chow | HFD | HDF + 21H21 | Chow) | vs HFD) |
| Day 119 | 27.94 | 30.34 | 26.63 | 8.6 | 12.24 |
| Day 123 | 28.06 | 31.5 | 26.76 | 12.25 | 15.04 |

Note:
After the start of the experiment, each group of 8 mice was weighed together once a week for a total of 6 times.

Experimental Example 2: Preparation of Cryostat Section of Tissue and Oil Red O Staining Liver tissue collected in Experimental Example 1 was embedded in OCT compound (Sakura Tissue-Tek) and then stored at −80° C. 7 μm thick tissue sections were cut and mounted on poly-L-lysine-coated histological slides. The sections of liver tissue were stored at −80° C.

The upper half of the heart together with the aortic root tissue collected in Experimental Example 1 was embedded in OCT compound (Sakura Tissue-Tek) and stored at −80° C. 7 μm thick tissue sections were sequentially cut until the aortic valves appeared and were confirmed under a microscope. The aortic root sections were mounted on poly-L-lysine-coated histological slides, and stored at −80° C.

Figure 1B:
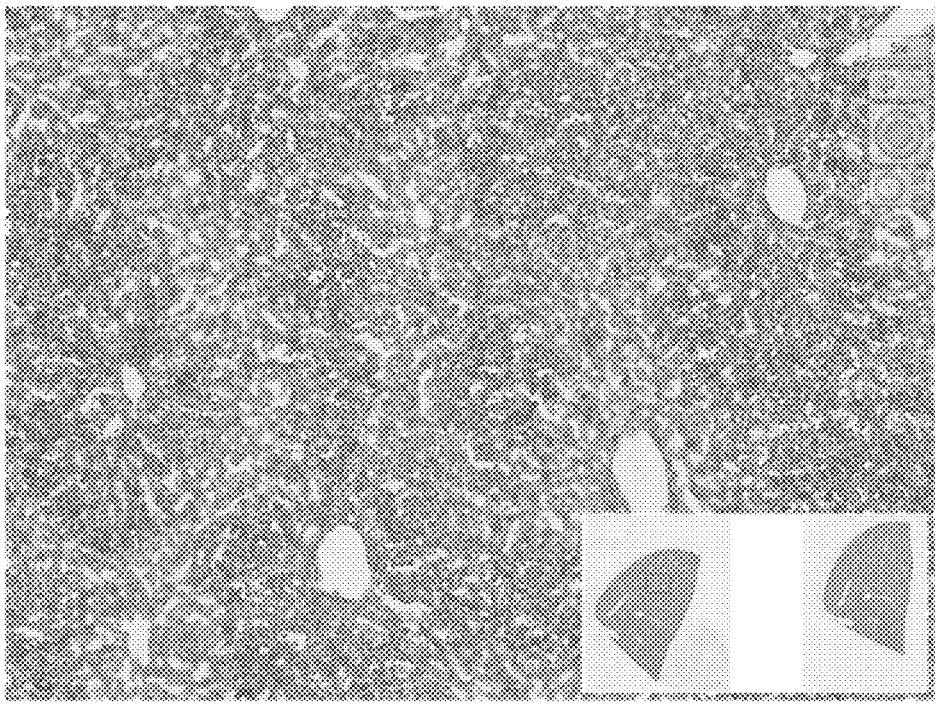
FIG. 1B shows Oil Red O staining of cryostat section of liver from apoE knockout mice fed with high fat diet (HFD) in Experimental Example 2.
Figure 1C:
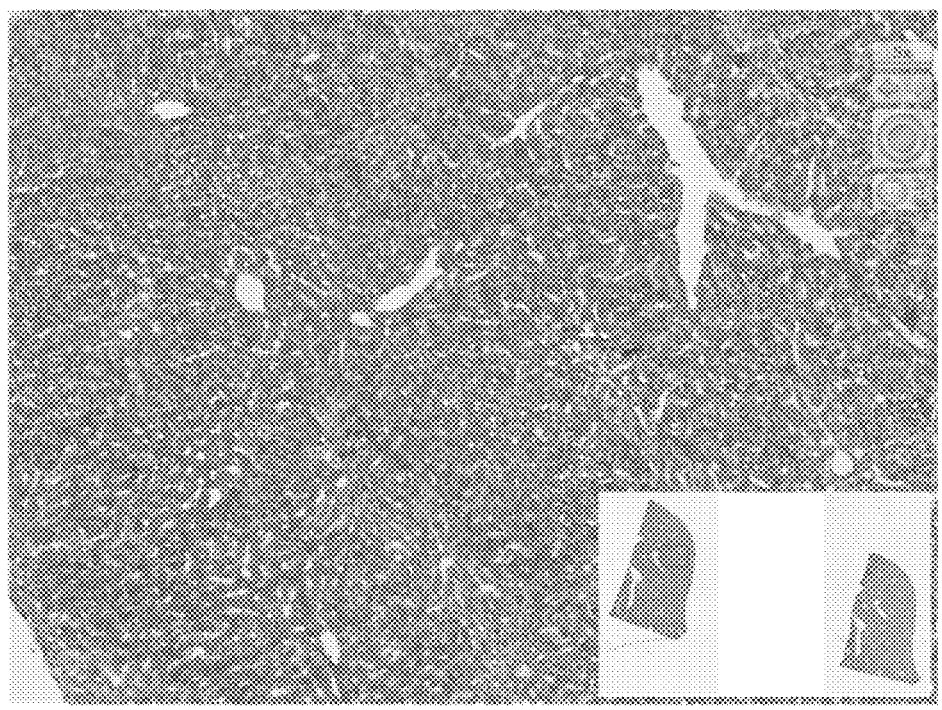
FIG. 1C shows Oil Red O staining of cryostat section of liver from apoE knockout mice fed with high fat diet plus the injection through the tail vein with polypeptide 21H21 (HFD+21H21) in Experimental Example 2.
Figure 3A:
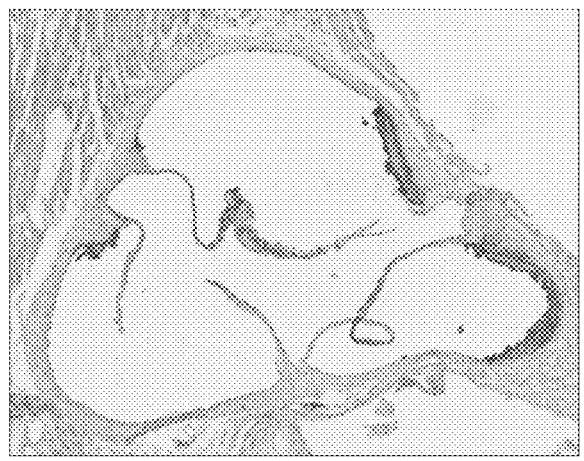
FIG. 3A shows Oil Red O staining of the aortic root of apoE knockout mice fed with low fat diet (Chow) in Experimental Example 2.
Figure 3B:
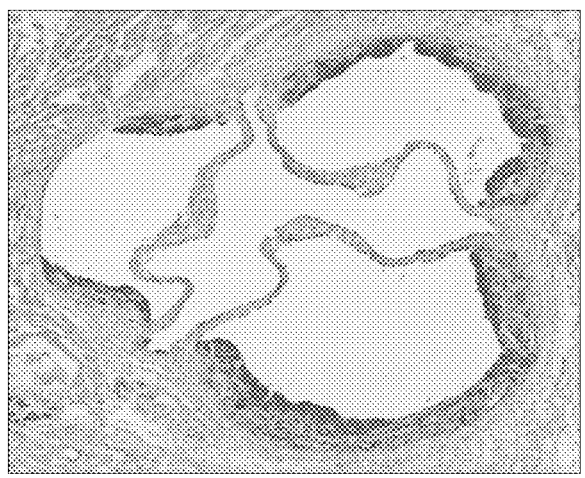
FIG. 3B shows Oil Red O staining of the aortic root of apoE knockout mice fed with high fat diet (HFD) in Experimental Example 2.
Figure 3C:
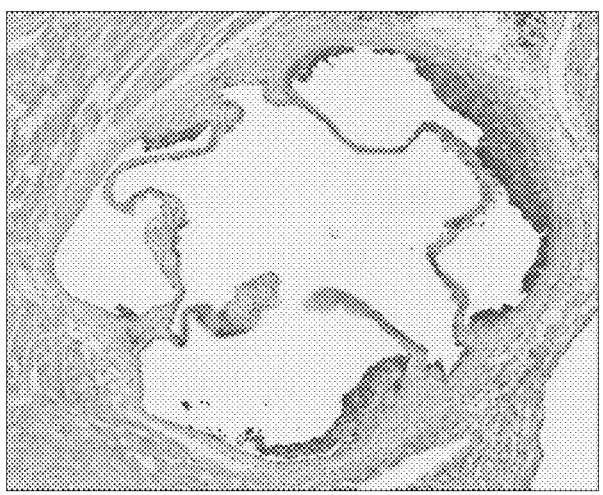
FIG. 3C shows Oil Red O staining of the aortic root of apoE knockout mice fed with highfat diet plus the injectionthrough the tail vein with polypeptide 21H21 (HFD+21H21) in Experimental Example 2.

Cryostat sections of tissue were thawed at room temperature for 10 minutes, and then stained with Oil Red O (O1391, Sigma-Aldrich) at room temperature for 10 minutes. After rinsing the slides with distilled water for 5 minutes, inspect the sections under a microscope to ensure optimal staining. If the staining time is insufficient, repeat the staining step. After staining, mount the tissue sections with coverslips using 2 to 3 drops of water-soluble mounting solution. 10 minutes later, seal the coverslip edges with nail polish. Take pictures of stained tissue sections under an inverted microscope. FIG. 1A-1C demonstrated Oil Red O staining of cryostat sections of liver from apoE knockout mice fed with low fat diet (Chow), high-fat diet (HFD), high fat diet plus the injection through the tail vein with polypeptide 21H21 (HFD+21H21) respectively. FIGS. 3A-3C showed Oil Red O staining of cryostat sections of aortic root from apoE knockout mice fed with low fat diet (Chow), high-fat diet (HFD), high fat diet plus the injection through the tail vein with polypeptide 21H21 (HFD+21H21) respectively.

Figure 2:
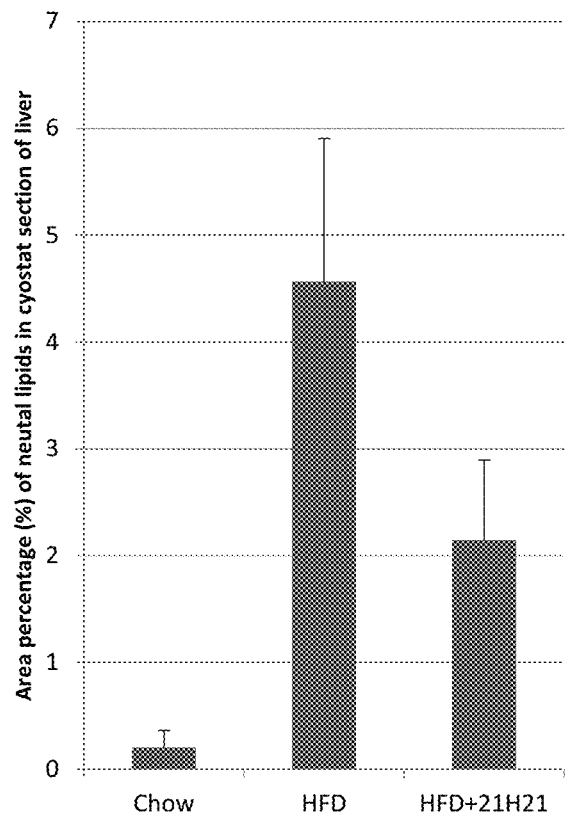
FIG. 2 shows area percentage (%) of neutral lipids in cryostat section of liver from apoE knockout mice identified by Oil Red O staining in Experimental Example 2. HFD group vs (HFD+21H21) group: p value=0.0004.

FIG. 2 represented the area percentage (%) of neutral lipids in cryostat sections of liver identified by Oil Red O staining among mice fed with low fat diet (Chow), high-fat diet (HFD), high fat diet plus the injection through the tail vein with polypeptide 21H21 (HFD+21H21) respectively. FIG. 2 showed that polypeptide DL21 was able to prevent the accumulation of neutral lipids in liver tissue caused by high-fat diet by 53% with p value=0.0004 [HFD vs (HFD+21H21)], which proves that the polypeptide 21H21 of the current invention can prevent the accumulation of neutral lipids in liver tissue.

Figure 4:
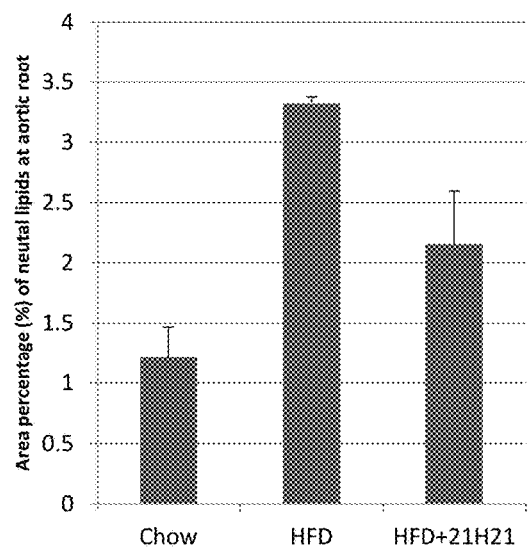
FIG. 4 shows area percentage (%) of neutral lipids at aortic root from apoE knockout mice identified by Oil Red O staining in Experimental Example 2.

FIG. 4 displayed the area percentage (%) of neutral lipids in cryostat sections of the aortic root identified by Oil Red O staining among mice fed with low fat diet (Chow), high-fat diet (HFD), high fat diet plus the injection through the tail vein with polypeptide 21H21 (HFD+21H21) respectively. FIG. 4 demonstrated that polypeptide 21H21 was able to prevent the accumulation of neutral lipids at the aortic root caused by high-fat diet by 35%, which proves that the polypeptide 21H21 of the current invention is capable of preventing the accumulation of neutral lipids at the aortic root.

Experimental Example 3: Aorta Separation and its Oil Red O Staining

Figure 5:
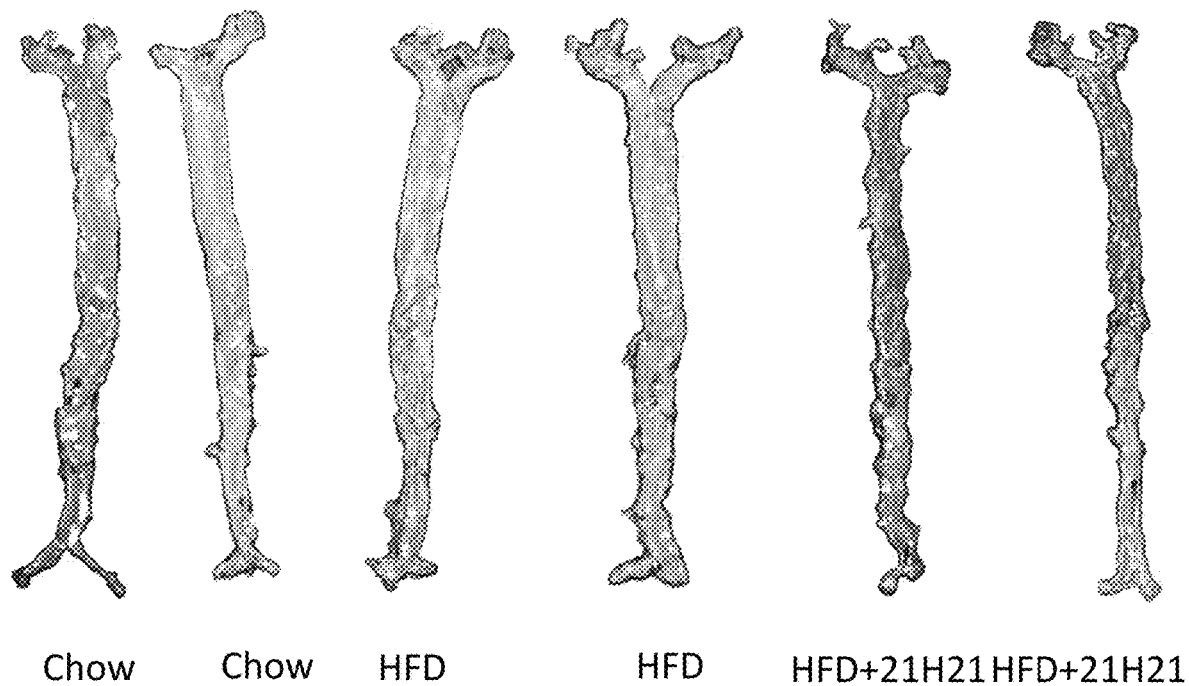
FIG. 5 shows Oil Red O staining of full-length aorta of apoE knockout mice in Experimental Example 3.

Aorta separation in Experimental Example 1 was carried out as Tangirala R K, et al. (Circulation. 1999; 100: 1816-1822). After apoE knockout mice were anesthetized and euthanized, the left ventricle was perfused with ice-cold 1× PBS for 10 minutes. The upper half of the heart together with the aortic root tissue was embedded in OCT compound (Sakura Tissue-Tek) and stored at −80° C. The aorta was removed after cutting off minor branching arteries and then fixed in paraformaldehyde-sucrose solution (4% paraformaldehyde, 5% sucrose, 20 μM EDTA, pH 7.4). After the adventitial and adipose tissue were removed, the aorta were cut open longitudinally, fastened on the black wax surface with a stainless steel needle (0.2 mm of diameter), fixed in the paraformaldehyde-sucrose solution at room temperature for 12 hours. The aorta was then rinsed with 1× PBS for 10 minutes 3 times each, followed by staining with Oil Red O for 1 hour. The stained aorta were photographed after washing with 1× PBS for 5 minutes. FIG. 5 represented Oil Red O staining of full-length aorta of apoE knockout mice fed with low fat diet (Chow), high-fat diet (HFD), high fat diet plus the injection through the tail vein with polypeptide 21H21(HFD+21H21) respectively.

Figure 6:
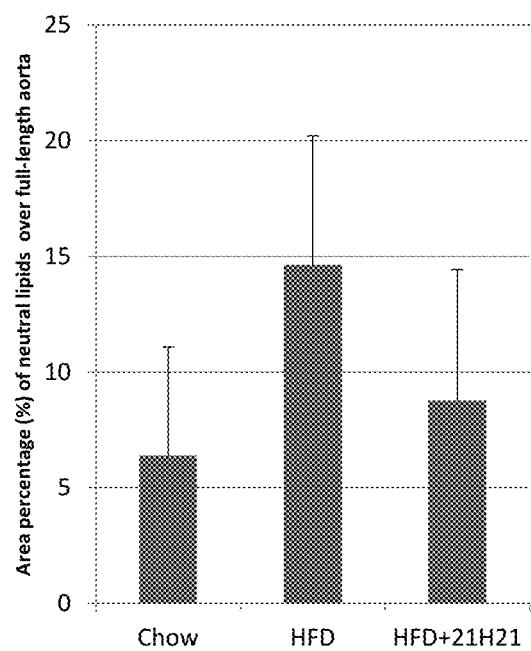
FIG. 6 shows area percentage (%) of neutral lipids over full-length aorta from apoE knockout mice identified by Oil Red O staining in Experimental Example 3. HFD group vs (HFD+21H21) group: p value=4.40108E-05.

FIG. 6 showed the area percentage (%) of neutral lipids over full-length aorta identified by Oil Red O staining. apoE knockout mice were fed with low fat diet (Chow), high-fat diet (HFD), high fat diet plus the injection through the tail vein with polypeptide 21H21 (HFD+21H21) respectively. Compared to untreated mice (HFD), polypeptide 21H21 in mice (HFD+21H21) could prevent atherosclerotic lesion of full-length aorta by 48%, which proves that polypeptide 21H21 is able to prevent the accumulation of neutral lipids in aorta.

Experimental Example 4: Animal Procedures

Male LDLR-deficient mice (C57BL/6-Ldlrem1Cd82/Nju) at age of 11 weeks were purchased fromGemPharmatech, Nanjing, Jiangsu, China. The mice were fed with low fat diet [SPF growth and reproduction feed for rats and mice: 12.95% fat (wt/wt), 24.02% protein (wt/wt)] from Beijing KeaoXieli Feed Co. Ltd., Beijing, China in a pathogen-free facility for two weeks, and then divided into the following three groups (8 mice each group): (a) the control group was fed low fat diet, referred to as Chow; (b) the high-fat group was fed high-fat diet (HFD) [21% fat (wt/wt), 0.15% (wt/wt) cholesterol, 20% protein (wt/wt), Research Diets, New Brunswick, NJ, D12079B], referred to as the HFD; (c) the treatment group was fed high-fat diet plus the injection through tail vein with polypeptide 21H21(50μg/200μL 1x PBS) once every three days, referred to as the HFD+21H21. The total injection was 10 times. One day after the last injection, the mice were anesthetized and euthanized in carbon dioxide, and then blood, liver and aorta werecollected. During the period of the experiment, each group of mice was weighed. All animal experiments were carried out in accordance with the animal management guidelines of the People's Republic of China.

Table 1 below shows that polypeptide 21H21 of the current invention was able to offset 29% of weight gain by high-fat diet in LDLR-deficient mice.

TABLE 1

(Each group had 8 mice.)

| Diet | Chow (n = 8) | HFD (n = 8) | HFD + 21H21 (n = 8) |
| --- | --- | --- | --- |
| Average body weight before experiment (g) | 26.29 ± 0.03 | 26.3 ± 0.02 | 26.54 ± 0.02 |
| Average body weight after experiment (g) | 28.43 ± 0.02 | 30.02 ± 0.01 | 29.2 ± 0.02 |
| Percentage of weight gain during experiment (%) | 8.14 | 14.15 | 10.02 |
| Percentage of weight gain offset by 21H21 (%) | | | 29.17 |

Experimental Example 5: Aorta Separation and its Oil Red O Staining

Figure 7:
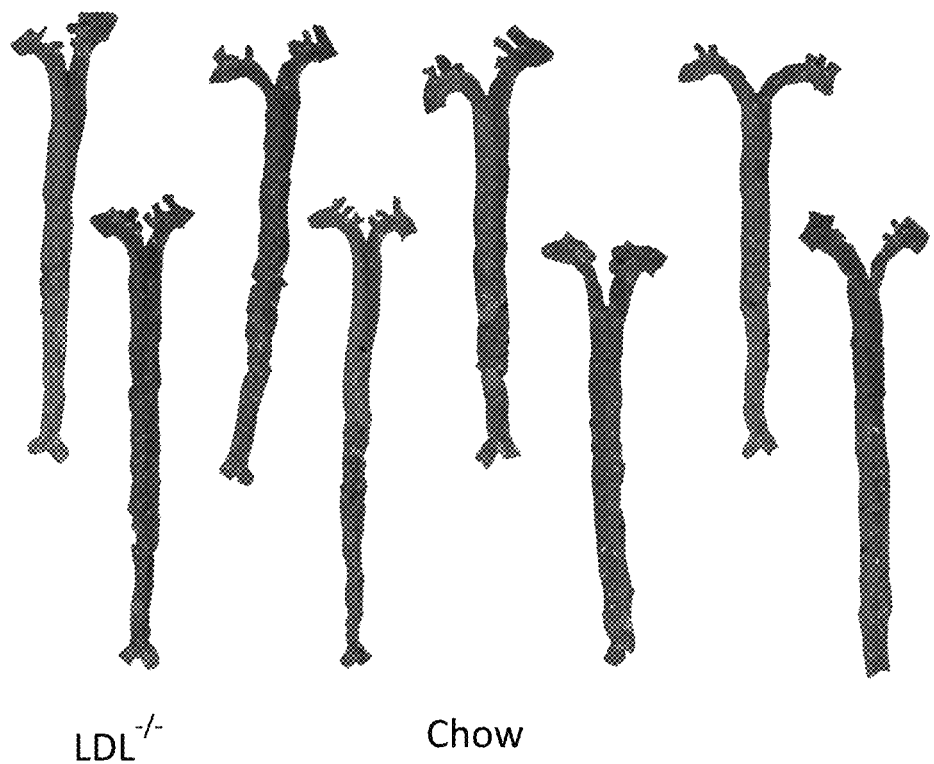
FIG. 7 shows Oil Red O staining of full-length aorta of LDLR-deficient mice fed with low fat diet (Chow) in Experimental Example 5.
Figure 8:
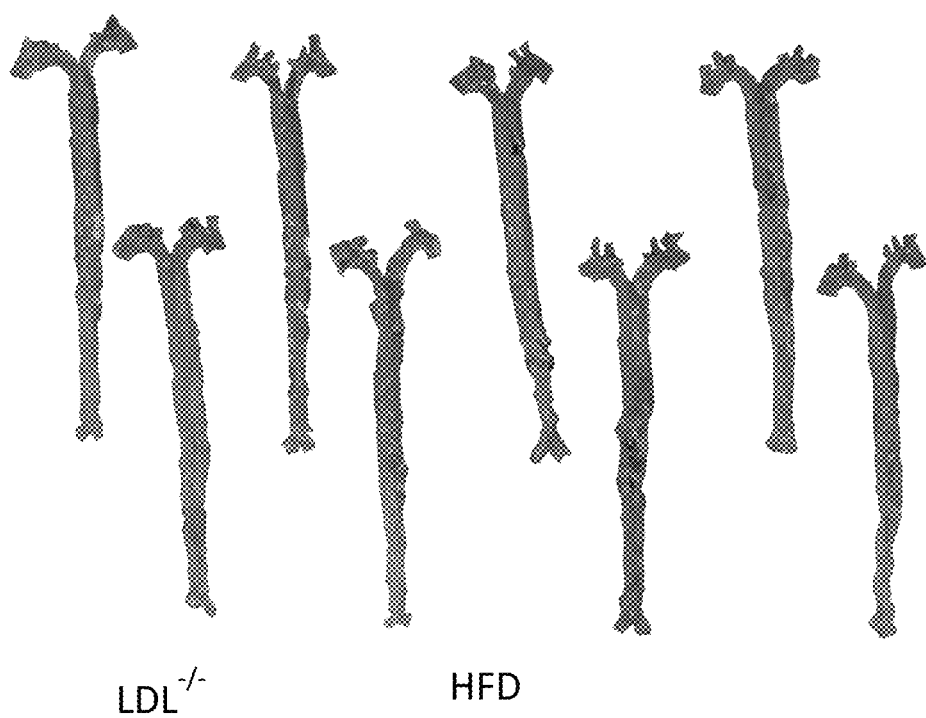
FIG. 8 shows Oil Red O staining of full-length aorta of LDLR-deficient mice fed with high fat diet (HFD) in Experimental Example 5.
Figure 9:
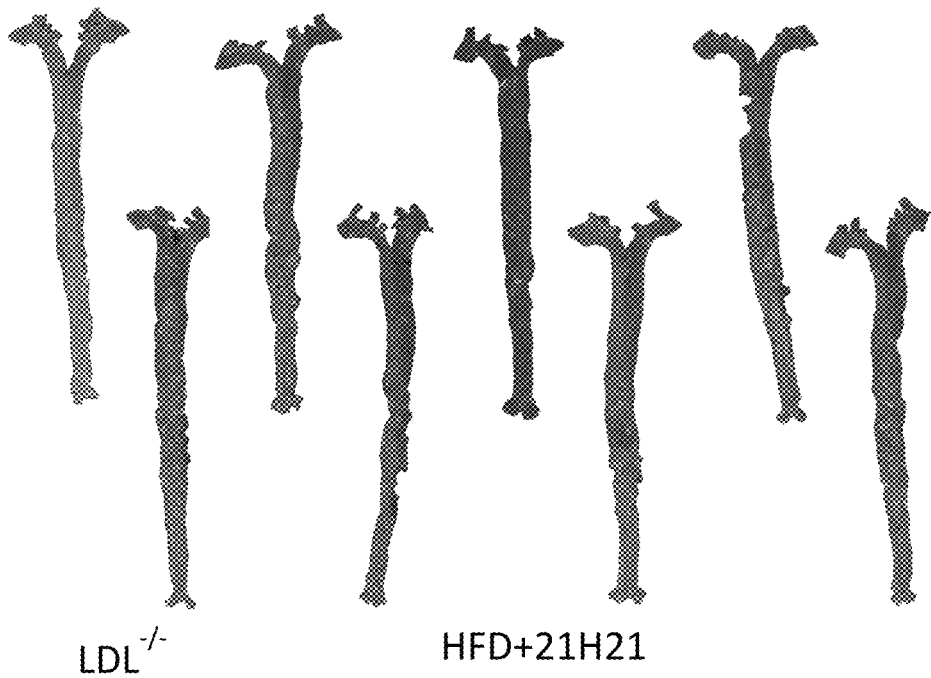
FIG. 9 shows Oil Red O staining of full-length aorta of LDLR-deficient mice fed with high fat diet plus the injection through the tail vein with polypeptide 21H21 (HFD+21H21) in Experimental Example 5.

Aorta separation in Experimental Example 4 was carried out as Tangirala RK, et al. (Circulation. 1999; 100: 1816-1822). After LDLR-deficient mice were anesthetized and euthanized, the left ventricle was perfused with ice-cold 1× PBS for 10 minutes. The upper half of the heart together with the aortic root tissue was embedded in OCT compound (Sakura Tissue-Tek) and stored at −80° C. The aorta was removed after cutting off minor branching arteries and then fixed in paraformaldehyde-sucrose solution (4% paraformaldehyde, 5% sucrose, 20 μM EDTA, pH 7.4). After the adventitial and adipose tissue were removed, the aorta were cut open longitudinally, fastened on the black wax surface with a stainless steel needle (0.2 mm of diameter), fixed in the paraformaldehyde-sucrose solution at room temperature for 12 hours. The aorta was then rinsed with 1× PBS for 10 minutes 3 times each, followed by staining with Oil Red O for 1 hour. The stained aorta were photographed after washing with 1× PBS for 5 minutes. FIG. 7 showed Oil Red O staining of full-length aorta of LDLR-deficient mice fed with low fat diet (Chow). FIG. 8 represented Oil Red O staining of full-length aorta of LDLR-deficient mice fed with high fat diet (HFD). FIG. 9 demonstrated Oil Red O staining of full-length aorta of LDLR-deficient mice fed with high fat diet plus the injection through the tail vein with polypeptide 21H21 (HFD+21H21).

Figure 10:
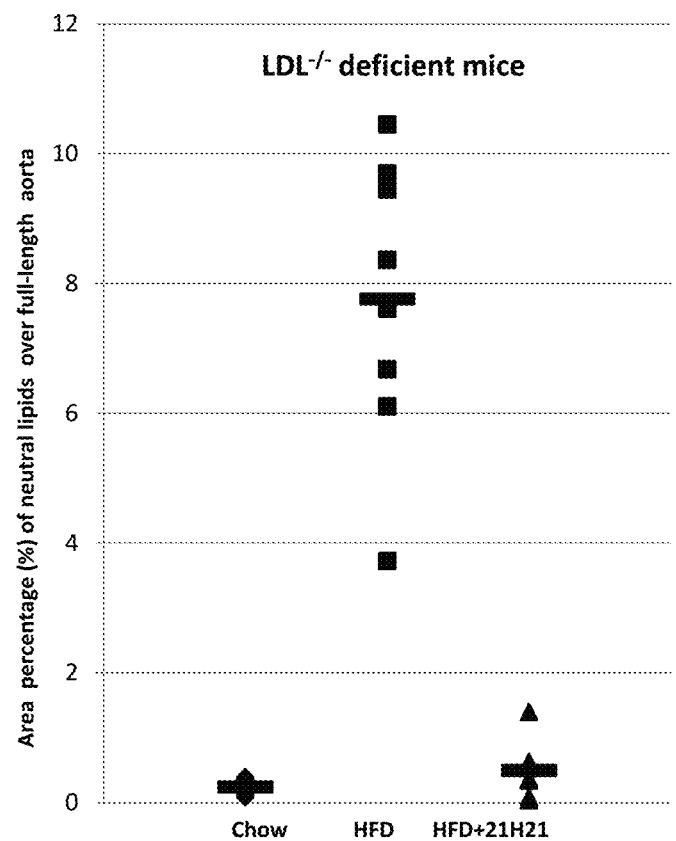
FIG. 10 shows area percentage (%) of neutral lipids over full-length aorta of LDLR-deficient mice identified by Oil Red 0 staining in Experimental Example 5. Chow: low fat diet; HFD: high fat diet; HFD+21H21: high fat diet plus injection of polypeptide 21H21 through the tail vein.

FIG. 10 displayed the area percentage (%) of neutral lipids over full-length aorta identified by Oil Red O staining. LDLR-deficient mice were fed with low fat diet (Chow), high-fat diet (HFD), high fat diet plus the injection through the tail vein with polypeptide 21H21 (HFD+21H21) respectively. Compared to untreated mice (HFD), polypeptide 21H21 in mice (HFD+21H21) could prevent atherosclerotic lesion of full-length aorta by 94%, which proves that polypeptide21H21 is able to prevent the accumulation of neutral lipids in aorta.

In Experimental Example 4 and Experimental Example 5, LDLR-deficient mouse model for atherosclerosis study was used. The in vivo experiments were carried out with the intravenous injection of polypeptides at low dose of 50 micrograms per mouse once every three days for four weeks. Compared to untreated mice, polypeptide was able to prevent 29% of body weight gain caused by high-fat and high-cholesterol diet; prevent atherosclerotic lesion of full-length aorta by 94%.

The above experiments are only auxiliary descriptions in nature, and are not intended to limit the application and use of current invention. The term "exemplary" means "serving as an example, example, or illustration". Any one of the exemplary embodiments herein may not necessarily be construed as being preferable or advantageous compared to other embodiments.

In addition, although at least one illustrative example or comparative example has been proposed in the foregoing embodiments, it should be understood that the current invention may still have a large number of changes. It should also be understood that the embodiments described herein are not intended to limit the scope, use, or configuration of the requested application target in any way. On the contrary, the foregoing embodiments will provide a convenient guide for those with ordinary knowledge in the art to implement one or more of the described embodiments. Furthermore, various changes can be made to the function and arrangement of the elements without departing from the scope defined by the scope of the patent application, and the scope of the patent application includes known equivalents and all foreseeable equivalents at the time of filing of this patent application.

What is claimed is:

1. A polypeptide, wherein the polypeptide consists of 16-23 consecutive amino acids of the amino acid sequence of SEQ ID NO: 1; or the polypeptide consists of 16-23 consecutive amino acids of the amino acid sequence of SEQ ID NO: 1 in the opposite direction of the peptide sequence (reverse peptide) and wherein said polypeptide is able to reduce high-fat diet induced weight gain and suppress neutral lipid accumulation.

2. The polypeptide according to claim 1, wherein the polypeptide is a polypeptide fragment selected from SEQ ID NO: 1, SEQ ID NO: 2,SEQ ID NO: 3, SEQ ID NO: 4, SEQ ID NO: 5, SEQ ID NO: 6, SEQ ID NO: 7 and SEQ ID NO: 8.

3. The polypeptide according to claim 1, wherein one or more of the amino acids in the polypeptide is in D-enantiomeric form.

4. The polypeptide according to claim 1, wherein the polypeptide is further modified.

5. The polypeptide according to claim 4, wherein polypeptide modifications are selected from the group consisting of N-terminal modification, C-terminal modification, side chain modification, amino acid modification, peptide backbone modification, amination modification, acetylation modification, biotinylation modification, fluorescent label modification, polyethylene glycol modification, prenylation modification, myristoylation and palmitoylation modification, phosphorylation modification, glycosylation modification, polypeptide conjugate modification, special amino acid modification, and combinations thereof.

6. The polypeptide according to claim 4, wherein the polypeptide is conjugated by stearic acid.

7. A method for the prevention or treatment of non-alcoholic fatty liver, atherosclerosis, metabolic syndrome, or for weight control, wherein the method comprises administering the polypeptide according to claim 1.

8. The polypeptide according to claim 1, wherein the polypeptide consists of 16-21 consecutive amino acids of the amino acid sequence of SEQ ID NO: 1; or the polypeptide consists of 16-21 consecutive amino acids of the amino acid sequence of SEQ ID NO: 1 in the opposite direction of the peptide sequence (reverse peptide).

9. The polypeptide according to claim 1, wherein the polypeptide consists of 21 consecutive amino acids of the amino acid sequence of SEQ ID NO: 1; or the polypeptide consists of 21 consecutive amino acids of the amino acid sequence of SEQ ID NO: 1 in the opposite direction of the peptide sequence (reverse peptide).

10. The polypeptide according to claim 3, wherein one or all amino acids of the polypeptide are in D-enantiomeric forms.

11. The polypeptide according to claim 4, wherein the polypeptide is conjugated by stearic acid to its end.

12. The polypeptide according to claim 4, wherein the polypeptide is conjugated by stearic acid to the N-terminus of the polypeptide.

\* \* \* \* \*